United States Patent
Barkol et al.

(10) Patent No.: US 9,087,142 B2
(45) Date of Patent: Jul. 21, 2015

(54) DETERMINING A SIMILARITY BETWEEN TREE RELATED STRUCTURES

(75) Inventors: Omer Barkol, Haifa (IL); Ruth Bergman, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 793 days.

(21) Appl. No.: 12/916,501

(22) Filed: Oct. 30, 2010

(65) Prior Publication Data

US 2012/0106367 A1 May 3, 2012

(51) Int. Cl.
*H04J 3/14* (2006.01)
*G06F 17/30* (2006.01)

(52) U.S. Cl.
CPC .... *G06F 17/30961* (2013.01); *G06F 17/30221* (2013.01)

(58) Field of Classification Search
CPC ............................ H04L 29/08072; H04L 47/10
See application file for complete search history.

(56) References Cited

U.S. PATENT DOCUMENTS

| 5,978,795 | A * | 11/1999 | Poutanen et al. | 1/1 |
| 2005/0038785 | A1 | 2/2005 | Agrawal et al. | |
| 2005/0228768 | A1 | 10/2005 | Thusoo et al. | |
| 2010/0030752 | A1 | 2/2010 | Goldentouch | |
| 2012/0005310 | A1 * | 1/2012 | Obata | 709/219 |

OTHER PUBLICATIONS

Davi de Castro Reis et al., Automatic Web News Extraction Using Tree Edit Distance, May 17-22, 2004, New York, New York, USA.*
Davi de Castro Reis et al. (NPL : Automatic Web News Extraction Using Tree Edit Distance, May 17-22, 2004).*
Auttomatic Web News Extraction Using Tree Edit Distance, Author: Davi de Castro Reis et al., May 17-22, 2004.*
Davi de Castro Reis et al, "Automatic Web News Extraction Using Tree Edit Distance", <http://portal.acm.org/citation.cfm?id= 988740 > Published May 17-22, 2004, pp. 502-511.
Shi, Lei et al, "A DOM Tree Alignment Model for Mining Parallel Data from the Web" Research Paper, ACL 2006 Proceedings ~8 pages.

* cited by examiner

*Primary Examiner* — Andrew Lai
*Assistant Examiner* — Leon Andrews
(74) *Attorney, Agent, or Firm* — Wagner Blecher (57) ABSTRACT

According to an order, a plurality of restricted top down model (RTDM) distances between a plurality of nodes residing on at least one tree related structure is determined. The determining includes determining a first RTDM distance between nodes of a first node pair of the plurality of nodes, wherein the determining the first RTDM distance comprises comparing prior determined RTDM distance measurements with the first node pair, wherein the prior determined RTDM distance measurements relate to node pairs preceding the first node pair within the order. The first RTDM distance measurement, the prior determined RTDM distance measurements and a second node pair of the plurality of nodes are compared. Based on the comparing, generating a second RTDM distance measurement.

20 Claims, 3 Drawing Sheets

DETERMINING A SIMILARITY BETWEEN TREE RELATED STRUCTURES

BACKGROUND

In general, data such as molecular data, XML data and Web content may be organized as trees rather than as a single relational table. Applications manipulate this data, and the content of these applications many times is automatically generated using templates. The content of these templates may be filled from databases or web toolkits comprising HTML documents that are incredibly complex. For example, a common search page, presented in simple form and which a user perceives as just a few interface objects, actually contains about 100 objects. While automatically generated content tends to be complex, it also tends to be consistent. Thus, the same functional components will tend to have a similar DOM (Document Object Model) structure.

DESCRIPTION OF THE DRAWINGS

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "determining", "comparing", "generating", "clustering", "storing", or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology is also well suited to the use of other computer systems such as, for example, optical computers.

The discussion will begin with a brief overview of the current tree mining methods and the limitations associated therewith, followed by a brief overview of embodiments of the present technology.

Overview

In general, one way to understand DOM structures is to find repeating DOM structures by finding frequent trees which are similar, but not necessarily identical. Current tree mining methods search for repeating subtree structures in an input collection of trees and vary in the restrictions that the repeating structure must adhere to and in the type of trees that are searched.

Tree edit algorithms may be used to find frequent trees. These tree edit algorithms have been used to solve problems in molecular biology, XML document processing and other disciplines. The prevalent definition of edit distance for labeled ordered trees allows three edit operations on nodes—delete, insert and relabel. For unordered trees the problem is known to be NP-hard. For ordered trees, on the other hand, polynomial algorithms exist, based on dynamic programming techniques. Restrictions associated with the definition of edit distance have been identified. For example, the constrained edit distance restricts the edit mapping such that two separate subtrees in one tree should be mapped to two subtrees in the other tree. This distance metric was studied for ordered trees and for unordered trees.

Another notion of tree distance for mining the web is the top-down edit distance, in which insertions and deletions are restricted to the leaves of the trees. A variant of this definition, the restricted top-down distance, is even more suitable for web mining, because it captures the process of building web pages.

The setting of DOM mining prescribes the type of trees we are working with; DOM trees form labeled ordered rooted trees. The repeating subtrees should include the actual content of the Web page. The internal nodes are often a collection of DIV and SPAN elements that can be aligned fortuitously. Thus, the subtrees are bottom-up, in principle, but small differences between trees are acceptable. For example, consider a set of search results, which have similar, but not identical formats. The acceptable differences, or edit operations, are also restricted.

However, the prevalent notion of edit distance does not match our intuition about the differences between HTML structures. For example, consider a complex control, such as a calendar control. This control may form a rather large tree in the DOM. Now consider embedding this control in an HTML page, i.e., an entire DOM tree is inserted for the control into a container element, with some small heading. Now consider the data mining scenario, in which we want to identify the calendar control. Note that the edit distance of the control with the control which is embedded in the container is very small. That is, it is quite difficult to isolate the control from its container. This distinction is enabled by the Restricted Top-Down edit Metric (RTDM) because of the restrictions it places on the permitted edit operations.

Given a collection of trees, all of the repeating subtrees therein may be sought. A method for finding such a repeating structure may be: (1) For each pair of nodes in all input trees, compute the RTDM of the subtrees beginning at these nodes, and store in a distance matrix; (2) Cluster the subtrees based on the computed distance matrix; and (3) Output significant clusters.

This method would find the structures sought. It uses bottom-up subtrees, but, by using the edit distance, it allows some differences between subtrees. Unfortunately, step (1) is computationally expensive. Given two trees with input size $n_1$ and $n_2$, the running time is $O(n_1^2 n_2^2)$, i.e., squared in the size of the input trees. Note that if we look for repeating structures on a single tree with n nodes, e.g., one web page, the running time is $O(n^4)$. While this algorithm may be somewhat naive, any algorithm using RTDM must repeatedly apply the distance computation. Because RTDM compares trees in a top-down manner, it never compares subtrees at different levels. Web structures are complex and varied enough that this comparison is needed to identify salient structures.

An embodiment of the present technology determines the RTDM distances between all the subtrees in the first tree and all the subtrees in the second tree in time $O(n_1 n_2)$, given two trees. The method uses dynamic programming, which is commonly used for top-down distance computation—sometimes together with recursion, and sometimes without it. Unlike prior methods, embodiments compute the edit distance in a bottom-up manner starting at the leaves and progressing up the nodes of the tree. The approach we take, inherently, computes for each pair of node the distances between the subtrees rooted at the nodes. The algorithm traverses the trees exactly once, resulting in improved running time. To find the repeating subtrees in a single input tree with this method would take time $O(n^2)$, rather than $O(n^4)$. For data mining applications, the difference between these running times is critical.

The restricted edit distance measure is formally defined in the next section. We derive the recurrence relations that compute this distance measure. The dynamic programming method is presented in the Operation section herein.

Thus, embodiments of the present technology enable a highly efficient method to mine a tree (or a forest) and find sets of sub-trees that are similar to each other. Embodiments of the present technology mine web pages, and, thus, use an appropriate tree edit distance. The distance metric may be determined very efficiently using the all-tree edit distance method. Based on this all-tree edit distance method, embodiments of the present technology provide a frequent similar tree method. Embodiments are very accurate in recognizing repeated (yet far from identical) constructs in a variety of Web pages.

The following discussion will preliminarily explain an infrastructure for embodiments of the present technology, including a definition of a restricted edit distance and clustering. The discussion will then focus on an example structure of an embodiment of the present technology, followed by an example method of operation of an embodiment of the present technology.

Infrastructure

In this section, the formal infrastructure for the discussion is presented. Directed-ordered-labeled trees are considered. Such a tree $T=(V, E, L)$ is a cycle-free graph which consists of a set of vertices V of size $|V|=n$ and a node-labeling function $L:V\to Lab$ where is a set of possible labels. In addition, it consists of a set of edges E, where an edge from u to v is an ordered pair $(v,u) \in E$. In this case we call v the parent of u and u is a child of v. In addition, for every vertex $v \in V$, the set $\{(v, u) \in E\}$ is an ordered set, so we can refer to a child as the first child, second child, etc. The root of the tree $r \in V$ is a vertex with in-degree 0 while any other vertex has in-degree 1 (the in-degree of a vertex is the number of edges of which it appears second). We say there is a path in the tree from v to u if v is a parent of u or there exists a set of edges $(v, u_1), (u_1, u_2), \ldots, (u_{k-1}, u_k), (u_k, u) \in E$. Let $P(w)=\{P_i(w)\}$ be a set of paths starting at a vertex $w \in V$.

There are three main types of subtrees that are considered in the literature, each is a refinement of the previous type. Given a tree $T=(V, E, L)$, a graph $S=(V', E', L)$ is said to be an embedded subtree of T if it is a tree, where $V' \subseteq V$, and for every edge $(v, u) \in E'$ there exists a path from v to u in T. Such a graph is said to be an induced subtree of T if it is an embedded subtree and for every edge $(v, u) \in E'$ then $(v, u) \in E$. That is, it is a tree rooted at some vertex which consists and all the vertices and edges that appear in some set of paths. Such a graph is said to be a bottom-up subtree if it is an induced subtree and for every $w \in V'$ and every $u \in V$ such that there exists a path from w to u in T, then $u \in V'$. That is, it is the complete subtree of T rooted at some vertex w. We will denote this subtree by T(w). We denote the empty tree by $\lambda$. From here on, if not otherwise specified, we will refer to bottom-up subtrees when considering subtrees.

A Restricted Edit Distance

Within the framework presented herein, some manipulation are allowed on trees. The allowed edit operations are somewhat different than that of standard operations and best suit our setting. The operations allowed in our framework are delete, insert and replace for sub-trees. For two trees $T_1=(V_1, E_1, L_1)$ and $T_2=(V_2, E_2, L_2)$ and two vertices $v_1 \in V_1$ and $v_2 \in V_1$ we define the replace operation by $T_1(T_1(v_2) \to T_2(v_2))$ to be the tree $T_1$, when taking out the sub-tree $T_1(v_1)$ and replacing it with the sub-tree $T_2(v_2)$, where the order of $v_2$ as a child is the same order that $v_1$ had and the labels given by $L_2$ remain (so in a sense $L_1$ is changed to be $L_1 \cup L_2$. When the context is clear we will write $T_1(v_1) \to T_2(v_2)$, for short. The delete operation, then, is defined to be $T_1(v_1) \to \lambda$ and the insert operation is defined to be $\lambda \to T_2(v_2)$.

Similar to other edit schemes, here too, we define a sequence of edit operations $S=s_1, \ldots, s_k$. The S-derivation of $T_1$ is defined to be the sequence of trees accepted by $T_1(s_1)(s_2) \ldots (s_k)$. If the resulting tree is $T_2$ we say that S is a derivation from $T_1$ to $T_2$ and we denote it by $$T_1 \xrightarrow{S} T_2.$$

We define a cost function $\gamma$, which assigns a real number to each edit operation. This cost function is constrained in our framework to be a distance metric. The cost for a sequence S is simply defined to be $\gamma(S)=\Sigma_{i=1}^k \gamma(s)$. We then define the edit distance between two trees $T_1$ to $T_2$ to be the lowest-cost S-derivation from $T_1$ to $T_2$ that is:

$$D(T_1, T_2) = \min_{S: T_1 \xrightarrow{S} T_2} \{\gamma(S)\}. \quad (1)$$

In order to proceed we broaden our definition to (directed-ordered-labeled) forests. A forest is a set of trees. The forests we are interested in are ordered forests, which means that the set of trees is ordered. All our definitions generalize naturally from trees to forests (including those of S-derivation, $\gamma$, and D, although the operations are still only defined for a single connected tree at a time). Given a tree $T=(V,E,L)$, for any $v \in V$ denote $F(v)$ to be the forest which consists all the sub-trees of T with the children of v as their roots, with the order of the forest remains as the order of them as children of v.

The following is straightforward:

Lemma 1 For any two trees $T_1=(V_1, E_1, L_1)$ and $T_2=(V_2, E_2, L_2)$ and two vertices within $v_1 \in V_1$ and $v_2 \in V_2$ it holds that:

$$D(T_1(v_1),\lambda) = \gamma(T_1(v_1) \to \lambda)$$

$$D(\lambda, T_2(v_2)) = \gamma(\lambda - T_2(v_2))$$

$$D(T_1(v_1), T_2(v_2)) = \begin{cases} \gamma(T_1(v_1) \to T_2(v_2)) & L_1(v_1) \neq L_2(v_2) \\ D(F_1(v_1), F_2(v_2)) & \text{otherwise} \end{cases} \quad (2)$$

where, the distance between two forests is defined as follows. For h∈{1, 2} let $F_h$ be a forest whose roots are $v_h^1$, $v_h^2, \ldots, v_h^{i_h}$, then $$D(F_1, \lambda) = \sum_{k=1}^{t_1} \gamma(T_1(v_1^k) \to \lambda) \quad (3)$$

$$D(\lambda, F_2) = \sum_{k=1}^{t_2} \gamma(\lambda \to T_2(v_2^k))$$

$$D(F_1, F_2) =$$

$$\min \begin{cases} \gamma(T_1(v_1^1) \to \lambda) + D((T_1(v_1^2), \ldots, T_1(v_1^{l_1})), F_2) \\ \gamma(\lambda \to T_2(v_2^1)) + D(F_1, (T_2(v_2^2), \ldots, T_2(v_2^{l_2}))) \\ D(T_1(v_1^1) \to T_2(v_2^1)) + D((T_1(v_1^2), \ldots, T_1(v_1^{l_1})), (T_2(v_2^2), \ldots, T_2(v_2^{l_2}))) \end{cases}$$

Proof: First note that for every tree, if changes are within a sub-tree S, then one can assume no operation is performed on any sub-tree that is not included in S. This is implied by the nature of the operations allowed: any operation on a sub-tree not including S is redundant, and any operation on a sub-tree including S can be replaced by an operation on S.

Equation (2) follows from the fact γ is a distance metric: the triangle inequality ensures that an operation sequence of length 1 is always the cheapest as $\gamma(a \to c) \leq \gamma(a \to b) + \gamma(b \to c)$. Thus, taking the first equality as an example. We know that for any sequence S. $D(T_1(v_1), \lambda) \leq \gamma(T_1(v_1) \to \lambda) \leq \gamma(S)$ as the sequence of length 1 applying the delete operation achieve this cost and since γ is a distance metric. Thus the second inequality applies for any sequence S. The third equation in Equation 2 follows from our two notes above (operating only within the sub-tree and preferring sequences of length 1).

Of note, and as will be described herein, Equations 2 and 3 are utilized to perform dynamic programming on a first RTDM distance measurement 122 and a second RTDM distance measurement 124.

The two first equations of Equation 3 follow trivially from the definition of the operations allowed on forests. The operations allowed cannot change the number of connected components (trees) of a forest. In addition, each single operation is performed on a single tree in the forest. Thus, the mapping which is induced by the edit distance computation of two forests consists, by definition, of a bi-partite matching between the trees comprising the forest. Moreover, as the two forests are ordered the bi-partite matching does not consists of crossing edges (that is, if tree $T(v_1^{i_1})$ is matched to tree $T(v_2^{j_1})$ and tree $T(v_1^{i_2})$ is matched to tree $T(v_2^{j_2})$ then $i_1 < i_2$ implies that $j_1 < j_2$). The edit distance then follows immediately by considering the three possible cases of whether the first trees in both forest are matched in the bi-partite match (if they both do, then by the remark above—they match to each other).

Whereas prior top-down edit distance metrics are defined as operations on nodes (or leaves), we define the edit distance in terms of operations on subtrees. Nonetheless, this definition differs from the top-down edit distance definition only in the relabel operation, and it is identical to RTDM.

Clustering

Having selected the distance measure between the subtrees, we next want to cluster like subtrees together. Like other data mining applications, a suitable clustering algorithm must be efficient in both time and space. For such applications, agglomerative hierarchical clustering is typically selected. This approach to clustering begins with every object as a separate cluster and repeatedly merges clusters. We used a mode finding clustering approach. This approach has good space and time performance because it uses neighbor lists, rather than a complete distance matrix. Neighbor lists are determined based on a distance threshold 0. The running time and memory requirement for the algorithm is O(N×average ($|\eta_0^i|$), where N is the number of objects to cluster and $\eta_0^i$ is the neighbor list of object i. We expect the neighbor lists to be small and independent of N.

Structure

Figure 1:
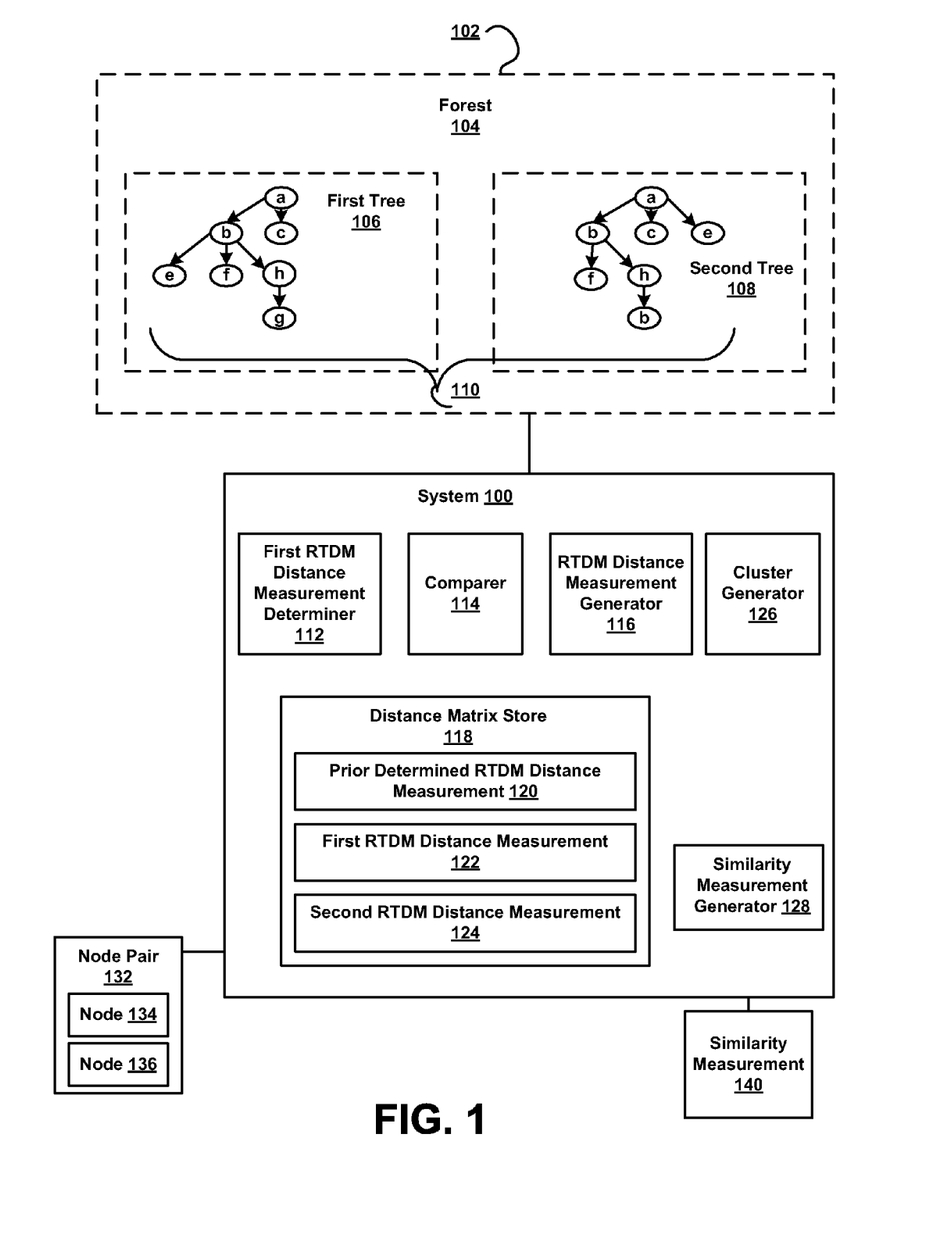
FIG. 1 is a block diagram of a system for determining a similarity between tree related structures, according to one embodiment of the present technology.

FIG. 1 shows an embodiment of a system 100 for determining a similarity between tree related structures 102, in accordance with embodiments of the present technology. In one embodiment, the system 100 includes a first RTDM distance determiner 112, a comparer 114, an RTDM Distance Measurement Generator 116, a distance matrix store 118, a similarity measurement generator 128 and a cluster generator 126.

In one embodiment, the RTDM distance determiner 112 is configured for determining, according to an order, a first RTDM distance measurement 122 between nodes of a first node pair of a plurality of nodes 110 of a tree related structure 102. The first RTDM distance measurement 122 is based on a comparison of the first RTDM distance measurement 122, prior RTDM distance measurements 120 for node pairs 132 preceding the first node pair (node 134 and 136, for example) within the reversed pre-order and the nodes of the first node pair. Of note, "node pairs" refers to a nodes of two different tree related structures 102 that correspond to each other. However, it is possible to have just one node within an expected "node pair". This happens when a first tree related structure contains a node and the second tree related structure does not have a corresponding node in an expected position. An example of this will be discussed below with reference to "deleting" or "inserting" a node during calculating an RTDM distance measurement. At present, it should be noted that when referring to a node, the node is also meant to be referred to as a sub-tree. Further, an "empty tree" is also a tree related structure. The tree is there, but without anything in it.

In one embodiment, a "reversed pre-order" is the order of the nodes, starting from the end of a tree and moving to its root. In particular, an order on a tree is an order of the nodes that outputs from recursively outputting the root, and then the order nodes of its children sub-trees, from left to right. The reversed pre-order is taking this order and reversing it. Using the second tree 108 of FIG. 1 as an example, the order of the nodes may be determined, and then reversed to get the "reversed pre-order". The order of the nodes starts at the root, a. It then moves to the left most child, node b. Node b is a child of a and also a root having nodes f and h as children. From here, the order again moves to the left most child, node f. After node f, the left most child of node b is node h. The left most child of node h is node b. Since node b does not have any children, the order moves to the next left most child of node a, after child node b, to arrive at node c. Finally, since node c itself has no children, the order moves to node e.

Thus, the order moves from node a to node b to node f to node h to node b to node c to node e. The movement of the reversed pre-order is the following: node e to node c to node b to node h to node f to node b to node a. Further, the plurality of nodes 110 refers to, in FIG. 1, all of the nodes of the first and the second tree, 106 and 108, respectively.

In one embodiment, in determining the first RTDM distance measurement 122 between nodes of a first node pair of the plurality of nodes 110 of the tree related structure, the first RTDM distance measurement 122 is the RTDM distance between the first node pairs, in the reversed pre-order, of two tree related structures. While looking at FIG. 1, in one embodiment, a tree related structure is the first tree 106, while another tree related structure is the second tree 108. However, it should be noted that a tree related structure may be a forest 104, a tree or a subtree, or any portion of a forest 104.

It should also be noted that a first pair of nodes may be any pair of nodes, regardless of its position within the reversed pre-order. The significance of the reversed pre-order lies in utilizing the prior determined RTDM distance measurements 120 to calculate the RTDM distance measurements of the instant pair of nodes. For example, assume that the first pair of nodes is the b of the first tree 106 and the b of the second tree 108. Essentially, the RTDM distance measurement describes how many changes must be made to one of the first tree 106 and the second tree 108 to make each most similar to the other. In this case, and starting at the b node of the first tree 106 and the b node at the second tree 108 wherein the b node is a root in both, and using the insert, delete and replace functions, it is determined that it requires three changes for the first tree 106 to be the most similar to the second tree 108.

Of note, when starting at the b/b node pair, the c of the first tree 106 and the c and e of the second tree 108 are not considered. In order for the first tree 106 starting at the b node and the second tree 108 starting at the b node to find a structure that is most similar to each other, the b node which is a child of h of the second tree 108 must be deleted and a g node, such as that found in the first tree 106, must be inserted in its place. This requires two changes, a deletion and an insertion. Further, for another required change, the e node of the first tree 106 must be deleted. The, the total count of necessary changes is "3".

In one embodiment of the present technology, the comparer 114 is configured for comparing the first RTDM distance measurement 122, the prior determined RTDM distance measurements 120 and the nodes of a second node pair of the plurality of nodes 110. (Of note, not all of the prior determined RTDM distance measurements 120 are necessarily used for comparison in this step; a portion less than the whole of the prior determined RTDM distance measurements 120 may be used.) For example and referring still to FIG. 1, if information is desired regarding the number of changes that need to be made to the second tree 108 to match the first tree 106 at the root nodes a for both trees, then the RTDM distance may be calculated using the RTDM distance measurement for the b node pair (the first node pair). For example, in embodiments, to determine the RTDM distance measurement between the node a of the first tree 106 and the node a of the second tree 108, the prior calculated RTDM distance measurements according to the reversed pre-order are utilized. In this case, the prior RTDM distance measurement 120 that was calculated was the RTDM distance measurement for the b node pair, "3". It should be noted that there may be just one prior calculated RTDM distance measurements or a plurality of prior calculated RTDM distance measurements.

Thus, embodiments of the present technology have determined the RTDM distance measurement of the b node pair, "3". In order to determine number of changes that are necessary for the first and second tree, 106 and 108, respectively, to match each other, the RTDM distance measurement for the c node pair and the e node pair have yet to be determined. It can be seen that the c node of the first and second tree 108 are the same. However, it can also be seen that the e node of the second tree 108 must be deleted in order to match the first tree 106. Thus, comparing the first RTDM measurement, "3", of the b node pair and the nodes of the second node pair of the plurality of nodes, provides the information necessary for embodiments of the present technology to generate a second RTDM distance measurement.

Thus, in one embodiment, an RTDM distance measurement generator 116 is configured for generating a second RTDM distance measurement 124 based on the comparing performed by the comparer 114. Following the instant example using FIG. 1, adding the RTDM distance measurement determination for the b node pair, "3" to that of the number of changes determined to be necessary for the e node pair of the second tree 108 to match that of the first tree 106, "1", renders "4" (for the final $M_v$ [as described in the Operation Section herein]). However, despite this last example, it should be noted that there are more editing possibilities that may be taken into account during the determination of the first and second RTDM distance measurements, 122 and 124, respectively. Thus, it may not be good enough to compare the RTDM distance measurement made immediately before the instant pair of nodes RTDM distance measurement was determined.

Referring now to Equations 2 and 3 described herein, Equations 2 and 3 give the definition of an RTDM distance measurement. More particularly, Equations 2 and 3 are both utilized to find each RTDM distance measurement, such as the first RTDM distance measurement 122 and the second RTDM distance measurement 124. The computations involved in Equations 2 and 3 are utilized to trace through a tree related structure 102 to find an ideal solution. Equations 2 and 3 are utilized to perform dynamic programming on two distance measures in parallel.

Thus, as discussed, in order to determine the difference between the first and the second tree 108, the RTDM distance measurements of the b node pairs of the first and the second tree 108 are used.

In one embodiment, a distance matrix store 118 stores the first and the second RTDM distance measurements, 122 and 124, respectively. It should be noted that while the distance matrix store 118 stores the first RTDM distance measurement 122, it also stores prior determined RTDM distance measurement 120. Of significance, each time the present technology determines a RTDM distance measurement that is closer to the root node than the last RTDM distance measurement, the second RTDM distance measurement becomes a first RTDM distance measurement. Further, the prior first RTDM distance measurement becomes a prior determined RTDM distance measurement 120 that remains stored in the distance matrix store 118 for use by the system 100. In this manner, dynamic programming is achieved through embodiments of the present technology.

In one embodiment, a similarity measurement generator 128 generates a similarity measurement 140 between nodes of at least one node pair of the plurality of node pairs using the first and second RTDM distance measurements, 122 and 124, respectively, that are stored in the distance matrix store 118. Further, in one embodiment, the similarity measurement generator 128 includes a repetition determiner. In one embodiment, the repetition determiner determines a repetition within the tree related structure 102 of a second portion of the tree related structure 102 based on a size of the clustering. Of note, the "second portion" may be the whole of the tree related structure 102 or a part less than the whole of the tree related structure 102.

In one embodiment, the repetition that is determined is that of a structural arrangement on an area of a page. Further, based on a predetermined amount of the repetition, a semantic importance of the structural arrangement is determined. In one embodiment, the "predetermined" amount may be a quantity of a number of repetitions that is programmed into the system 100. When the system 100 becomes aware that the predetermined number of repetitions has been discovered, the semantic importance of that structural arrangement is observed. For example, the repetition of semantics within a web page, etc., shows the significance of the semantics' importance to the meaning of that page.

In another embodiment, a user searches for the structural arrangement on an area of a page. A search request may be made for a certain structural element appearing on a particular area of a page. In one embodiment, the page is a web page. In another embodiment, the page is part of a file. The system 100 may decide that certain pages containing particular desired structural elements are similar enough to cluster together.

Thus, in one embodiment, a cluster generator clusters a portion of the tree related structure based on the first and second RTDM distance measurements and the similarity measurement.

Operation

Embodiments of the present technology determine the edit distance of every pair of subtrees in two input trees, efficiently, while adopting a dynamic programming approach. Prior methods began at the root of the tree and followed the structure of the tree down. Embodiments of the present technology, on the other hand, use a bottom-up approach. All subtrees are matched to each other, which forms the basis of the all-subtree computation. As the computation moves up the tree, the constraints due to tree structure are enforced.

Figure 2:
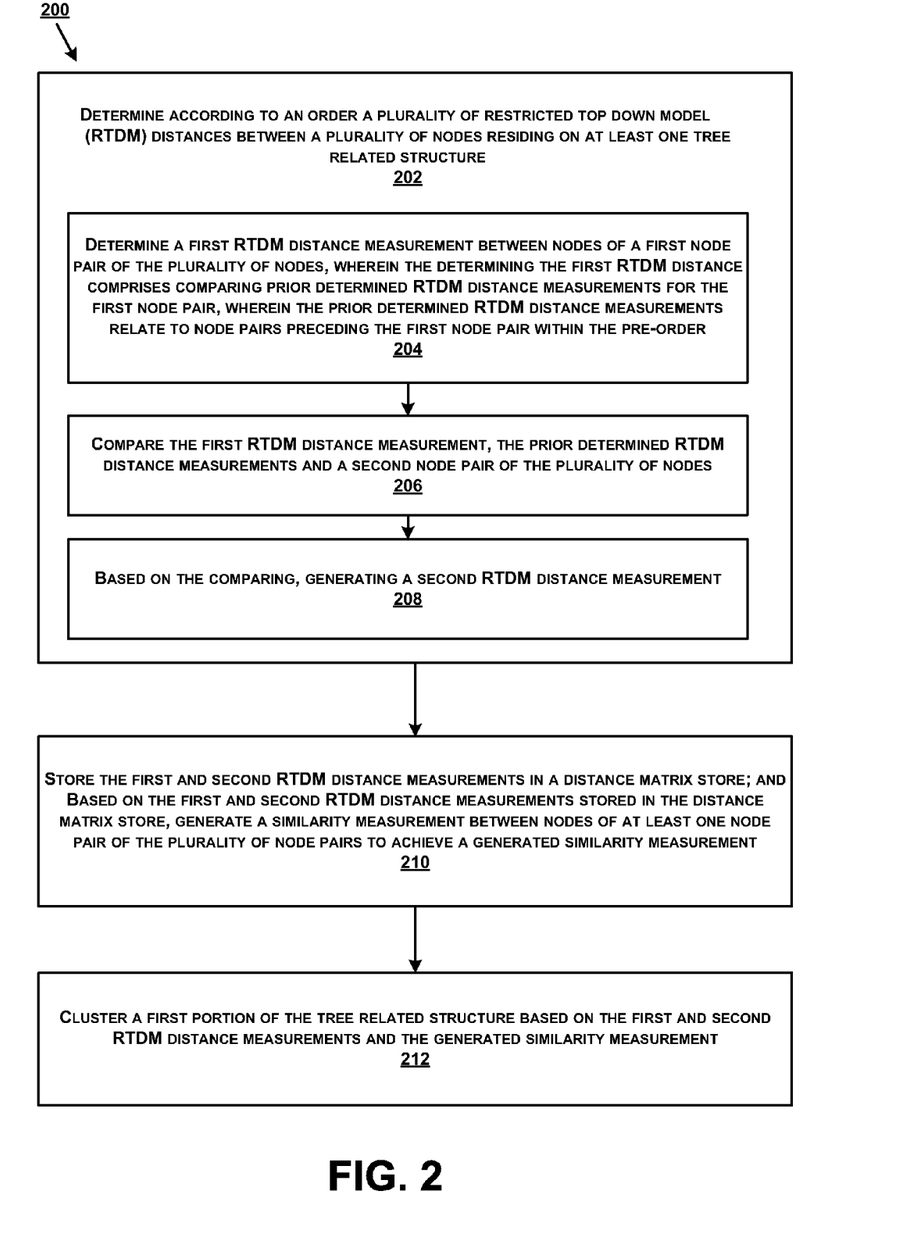
FIG. 2 is a flow diagram of a method for determining a similarity between tree related structures, according to one embodiment of the present technology.

Referring now to FIG. 2, a flow diagram of a method 200 for determining a similarity between tree related structures 102 is shown in accordance with embodiments of the present technology. At step 202 and as described herein, in one embodiment, a plurality of restricted top down model (RTDM) distances between a plurality of nodes 110 residing on at least one tree related structure are determined according to an order. In one embodiment, the order is reversed. Step 202 includes the following steps: 204; 206 and 208.

Of note, while method 200 describes determining a first and second RTDM distance measurement s, 122 and 124, respectively, the method 200 may be performed iteratively. For example, after the "first" 122 and then the "second" RTDM distance measurement 124 is determined, the method 200 may be performed again, in which case the second RTDM distance measurement 124 now becomes the first RTDM distance measurement 122, and the first RTDM distance measurement 122 becomes the prior determined RTDM distance measurement 120. The method 200 may be performed once, twice, or many times. As described herein, this method 200 enables dynamic programming of at least two distance measures in parallel.

At step 204 and as described herein, in one embodiment, a first RTDM distance measurement 122 between nodes of a first node pair of the plurality of nodes 110 is determined, wherein the determining the first RTDM distance measurement 122 comprises comparing prior determined RTDM distance measurements 120 with the first node pair, wherein the prior determined RTDM distance measurements 120 relate to node pairs preceding the first node pair within the order.

At step 206 and as described herein, in one embodiment, the first RTDM distance measurement 122, the prior determined RTDM distance measurements 120 and a second node pair of the plurality of nodes is compared. At step 208 and as described herein, based on the comparing of step 206, in one embodiment, a second RTDM distance measurement 124 is generated.

At step 210 and as described herein, in one embodiment, the first and second RTDM distance measurements, 122 and 124, respectively, are stored in a distance matrix store 118. Based on the first and second RTDM distance measurements stored in the distance matrix, in one embodiment a similarity measurement between nodes of at least one node pair of the plurality of node pairs is generated to achieve a generated similarity measurement.

At step 212 and as described herein, in one embodiment, a first portion of the tree related structure 102 is clustered based on the first and second RTDM distance measurements 122 and 124 and the generated similarity measurement. In one embodiment, the first portion of the tree related structure 102 that has a predetermined similarity measurement that represents a closeness between subportions of the first portion is clustered. (Of note, the first portion may be any portion of the tree related structure.) For example, it may be pre-determined that an RTDM distance measurement of 2 is enough for two nodes to be considered similar. Thus, all node pairs having an RTDM distance measurement of 2 or less are clustered together for the present technology.

In one embodiment, the generating of a similarity measurement includes the determining of a repetition within the tree related structure 102 of a second portion of the tree related structures 102 based on a size of the clustering. In one embodiment and as described herein, determining a repetition of a portion of the tree related structure 102 includes determining a repetition of a structural arrangement on an area of a page; and based on a predetermined amount of the repetition, determining a semantic importance of the structural arrangement.

The following is a discussion of the details of the determination of the RTDM distance measurement.

To compute the edit distance we consider, for any vertex in the T, the subtree rooted at this vertex as a reversed pre-order sequence of vertices. (Note that this is not equal to post-order as the right-most child will appear first in our case.) Let $v_i$ be the ith vertex in that order ($i \geq 1$).

Given two trees T1 and T2, for any $h \in \{1,2\}$ denote the index of the first child by, $$C_h(i) = \begin{cases} i-1 & \text{if } v_i \text{ of } T_h \text{ has children} \\ 0 & \text{otherwise} \end{cases} \quad (4)$$

and the index of the previous sibling (sibling to the right) by, $$I_h(i) = i - |T_h(v_i)| \quad (5)$$

We then define the two following matrices of dimensions $(n_3+1) \times (n_2+1)$, where the first is aimed to capture the required distances between each two subtrees, and the second assists the computation of the first by holding the distance between the two forests that contain the sub-trees rooted at the siblings to the right of each of these nodes:

$$M_V(0, 0) = 0 \quad (6)$$

$$i > 0 \; M_V(i, 0) = \gamma(T_1(v_i) \to \lambda)$$

$$j > 0 \; M_V(0, j) = \gamma(\lambda \to T_2(v_j))$$

-continued $$i, j > 0 \quad M_V(i, j) = \begin{cases} \gamma(T_1(v_i) \to T_2(v_j)) & L_1(v_i) \neq L_2(v_j) \\ M_F(C_1(i), C_2(j)) & \text{otherwise} \end{cases}$$

and $$M_F(0, 0) = 0$$

$$i > 0 \quad M_F(i, 0) = M_V(i, 0) + M_F(I_1(i), 0)$$

$$j > 0 \quad M_F(0, j) = M_V(0, j) + M_F(0, I_2(j))$$

$$i, j > 0 \quad M_F(i, j) = \min \begin{cases} M_V(i, 0) + M_F(I_1(i), j) \\ M_V(0, j) + M_F(i, I_2(j)) \\ M_V(i, j) + M_F(I_1(i), I_2(j)) \end{cases}$$

Our algorithm will be standard dynamic programming. For each $i \geq 0$—the ith row and column in $M_v$, then fill the ith row and column of $M_F$. Notice that by definition, for any $i \geq 1$ and $h$, $I_h(i) < i$ and $C_h(i) < i$. The following algorithm computes the edit distance.

Algorithm: Compute All-Subtree Edit Distance

```
Input:   Trees T1 and T2
Output:  Matrix MV where MF[i,j] equals to the distance D(T1(vi),T2(vj))
EditDistance(T1(V1,E1,L1),T2(V2,E2,L2)){
    (T1,S1,C1,PS1) = computeArrays(T1)
    (T2,S2,C2,PS2) = computeArrays(T2)
    MV[0,0] = MF[0,0] = 0 % Initialization
    for i=1 to n1
        MV[i,0] = Gamma(S1[i],0)
        MF[i,0] = MV[i,0] + MF[PS[i],0]
```

Algorithm: Compute All-Subtree Edit Distance

```
    for j=0 to n2
        MV[0,j] = Gamma(0,S2[j])
        MF[0,j] = MV[0,j] + MF[0,PS[j]]
    for i=1 to n1
        for j=1 to n2
            if T1[i] = T2[j]
                then MF[i,j] = MF[C1[i],C2[j]]
            else MV[i,j] = Gamma(S1[i],S2[j])
            MF[i,j] = min(MV[i,0]+MF[PS[i],j],
                          MV[0,j]+MF[i,PS2[j]],
                          MV[i,j]+MF[PS1[i],PS2[j]])
    Output:   MV
}
computeArrays(T(V,E,L)){%
    Go over all vertices v of T in reverse pre-order
    (rightmost leaf at index i=1 to root at index n):
        T[i] = L(vi) % Label at vertex i
        S[i] = |T(vi)| % Subtree size of vertex i
        if S[i]=0 then C[i] = 0
        else C[i] = i-1
        PS[i] = i-S[i] % Position of previous sibling
    Output (T,S,C,PS)
}
Gamma(T1((V1,E1,L1)),T2((V2,E2,L2))){ % Gamma Example
    Output:   n1 + n2
}
```

The following is a example of the computation of the distances between the sub-trees of the two trees in FIG. 1 (the first tree 106 and the second tree 108), as demonstrated in Table 1 below. Two matrices will be computed—the distances matrix $M_v$ and the forest distance matrix $M_F$ as defined in the previous section—where the nodes are ordered in reversed pre-order.

TABLE 1

Running example of the All Sub-Trees Distances Algorithm

| $M_V$ - Initialization | | | | | | | | | $M_F$ - Initialization | | | | | | | | |
|---|---|---|---|---|---|---|---|---|---|---|---|---|---|---|---|---|---|
| | j | 0 | 1 | 2 | 3 | 4 | 5 | 6 | 7 | | j | 0 | 1 | 2 | 3 | 4 | 5 | 6 | 7 |
| i | | — | c | g | h | f | e | b | a | i | | — | c | g | h | f | e | b | a |
| 0 | — | 0 | 1 | 1 | 2 | 1 | 1 | 5 | 7 | 0 | — | 0 | 1 | 1 | 2 | 3 | 4 | 6 | 7 |
| 1 | e | 1 | | | | | | | | 1 | e | 1 | | | | | | | |
| 2 | c | 1 | | | | | | | | 2 | c | 1 | | | | | | | |
| 3 | b | 1 | | | | | | | | 3 | b | 1 | | | | | | | |
| 4 | h | 2 | | | | | | | | 4 | h | 2 | | | | | | | |
| 5 | f | 1 | | | | | | | | 5 | f | 3 | | | | | | | |
| 6 | b | 4 | | | | | | | | 6 | b | 6 | | | | | | | |
| 7 | a | 7 | | | | | | | | 7 | a | 7 | | | | | | | |

| $M_V$ - Next Line | | | | | | | | | $M_F$ - Next Line | | | | | | | | |
|---|---|---|---|---|---|---|---|---|---|---|---|---|---|---|---|---|---|
| | j | 0 | 1 | 2 | 3 | 4 | 5 | 6 | 7 | | j | 0 | 1 | 2 | 3 | 4 | 5 | 6 | 7 |
| i | | — | c | g | h | f | e | b | a | i | | — | c | g | h | f | e | b | a |
| 0 | — | 0 | 1 | 1 | 3 | 1 | 1 | 5 | 7 | 0 | — | 0 | 1 | 1 | 2 | 3 | 4 | 6 | 7 |
| 1 | e | 1 | 2 | 2 | 3 | 3 | 0 | 6 | 8 | 1 | e | 1 | 2 | 2 | 3 | 4 | 3 | 7 | 8 |
| 2 | c | 1 | | | | | | | | 2 | c | 1 | | | | | | | |
| 3 | b | 1 | | | | | | | | 3 | b | 1 | | | | | | | |
| 4 | h | 2 | | | | | | | | 4 | h | 2 | | | | | | | |
| 5 | f | 1 | | | | | | | | 5 | f | 3 | | | | | | | |
| 6 | b | 4 | | | | | | | | 6 | b | 6 | | | | | | | |
| 7 | a | 7 | | | | | | | | 7 | a | 7 | | | | | | | |

| $M_V$ - Final | | | | | | | | | $M_F$ - Final | | | | | | | | |
|---|---|---|---|---|---|---|---|---|---|---|---|---|---|---|---|---|---|
| | j | 0 | 1 | 2 | 3 | 4 | 5 | 6 | 7 | | j | 0 | 1 | 2 | 3 | 4 | 5 | 6 | 7 |
| i | | — | c | g | h | f | e | b | a | i | | — | c | g | h | f | e | b | a |
| 0 | — | 0 | 1 | 1 | 2 | 1 | 1 | 5 | 7 | 0 | — | 0 | 1 | 1 | 2 | 3 | 4 | 5 | 7 |
| 1 | e | 1 | 2 | 2 | 3 | 2 | 0 | 6 | 8 | 1 | e | 1 | 2 | 2 | 3 | 4 | 3 | 7 | 8 |
| 2 | c | 1 | 0 | 2 | 3 | 2 | 2 | 6 | 8 | 2 | c | 1 | 1 | 3 | 4 | 5 | 4 | 7 | 9 |

TABLE 1-continued

Running example of the All Sub-Trees Distances Algorithm

| 3 | b | 1 | 2 | 2 | 3 | 2 | 2 | 4 | 8  | 3 | b | 1 | 1 | 2 | 3 | 4  | 5  | 5 | 8  |
|---|---|---|---|---|---|---|---|---|----|---|---|---|---|---|---|----|----|---|----|
| 4 | h | 2 | 3 | 3 | 2 | 3 | 3 | 6 | 9  | 4 | h | 2 | 3 | 3 | 2 | 3  | 4  | 7 | 9  |
| 5 | f | 1 | 2 | 2 | 3 | 0 | 2 | 6 | 8  | 5 | f | 3 | 4 | 4 | 3 | 2  | 3  | 8 | 10 |
| 6 | b | 4 | 5 | 5 | 6 | 5 | 5 | 3 | 11 | 6 | b | 6 | 5 | 7 | 8 | 9  | 10 | 4 | 13 |
| 7 | a | 7 | 8 | 8 | 9 | 8 | 8 | 12| 4  | 7 | a | 7 |   |   |   |    |    |   |    |

Table 1 shows three pairs of matrices at three stages of the algorithm. In the first part, we demonstrate the initialization stage as appears in Equation 6. The matrix $M_V$ is initialized by the costs of the insert/delete of the sub-tree rooted at the node (here set to be the size of the sub-tree), and the matrix $M_F$ is initialized using the values in $M_V$ and in $M_F$. For example, the bold entry in $M_F$ is computed as follows:

$$M_F(0,4) = M_V(0,4) + M_F(0,I_2(4)) = M_V(0,4) + M_F(0,3) = 1 + 2 = 3.$$

The next line of the matrices are computed by Equation 6. Note how the entries of $M_F$ are computed as a minimum of three values. For example, the bold entry in $M_F$ is computed as follows (see Equation 6):

$$M_F(1,5) = \min \begin{cases} M_V(1,0) + M_F(I_1(1),5) = \\ M_V(1,0) + M_F(0,5) = 1+4 \\ M_V(0,5) + M_F(1,I_2(5)) = \\ M_V(0,5) + M_F(1,4) = 1+4 \\ M_V(1,5) + M_F(I_1(1),I_2(5)) = \\ M_V(1,5) + M_F(0,4) = 0+3 \end{cases}$$

The matrices are filled line by line. The values of $M_V$ are filled according to Equation 6 to be either the cost of replace: For example the bold value 12 is calculated as follows: $M_V(7,6) = \gamma(T_1(v_7) \to T_2(v_6)) = M_F(0,6) + M_C(7,0) = 5+7 = 12$, where our replace function $\gamma$ is the cost of delete and insert. Or, in case the root nodes agree on their value, it is computed like the bold $M_V(6,6) = M_F(C_1(6), C_2(6)) = M_F(5,5) = 3$. The distance between the two trees appears in $M_F(7,7) = M_F(C_1(7), C_2(7)) = M_F(6,6) = 4$.

Embodiments of the present technology find sets of subtrees, such that each set contains a number of subtrees which are similar to each other. Thus, the required output is a meaningful clustering of bottom-up subtrees, in which the similarity measure is the RTDM. Given the All-Subtree Edit Distance Algorithm presented herein, the frequent tree algorithm is straightforward.

For example, given the input tree, the following is performed according to embodiments of the present technology: run the All-Subtree Edit Distance Algorithm as appears herein getting the distance matrix between every two subtrees in the input tree; based on the computed distance matrix, cluster the subtrees according to some clustering algorithm; and using configured thresholds, output the significant clusters. The output can be given as a list of cluster representatives and the cluster's radius.

In the above algorithm, clustering uses a threshold on distance, which is application specific. The conditions that determine significant clusters also depend on the application. For example, clusters might be required to comprise a minimum number of repetitions, or a maximal number of repetitions. Other conditions for significant clusters may depend on the size of the structures, the quantity of significant elements within the constructs, e.g., in web pages, elements which are not DIV or SPAN.

For practical data mining applications, embodiments support implementing the Frequent Similar Trees algorithm in a manner that supports an online setting. In such a setting, a person might browse the Web. Each time he approaches a new page, the DOM tree of this new page is added to the analysis. The edit distances are computed for the subtrees in the current tree as well as the subtrees in prior trees. Space is conserved by storing neighbor lists, rather than the complete distance matrix. The existing clustering is updated using the stored neighbor lists, thereby, creating new clusters and adding new members to existing clusters. This method might be sensitive to the browsing order, but it has the benefit of being extremely efficient. We believe the main constructs in a Web-site will not be too sensitive to that order.

The following is a discussion of two applications of embodiments for DOM mining.

DOM Structure Mining

The ability to efficiently find repeating structure in trees has immediate applications for mining Web applications. Several classes of constructs common to Web applications manifest as repeating DOM structures, including controls, records and containers.

Controls are user-interface components, which provide a desirable functionality, for example a calendar control and a video control. The DOM structure of controls is typically identical.

Records display information to the user, e.g., search results in a web search engine, items for purchase in an on-line store, videos on-line, the content of a shopping cart, etc. The DOM structures of records are not typically identical, but they contain a lot of common structure.

Containers display loosely related information to the user. For example, containers may contain "Videos Being Watched Now", "Featured Videos" and "Most Popular". Portlets are also a common type of container. Containers typically have a similar structure in the header, but very different structure in the content.

Prior work on DOM mining has focused on finding records. Often heuristics, such as examining sibling structures, have been used to make the search efficient. Our algorithm is efficient enough that no such heuristics are necessary. The algorithm can be used to find all three types of structures. Controls are easy to find, since the distance between the entire cluster of subtrees is 0. The algorithm can find these repeating structures anywhere in the page, or on a number of pages. Records can be found by allowing clusters with some dissimilarity. We typically use 20% of the combined length of the subtrees as a distance threshold. A useful post-processing phase would add to pattern clusters such structures that may be less similar structurally to the pattern cluster (e.g., 40% distance), but are siblings of structures in the cluster and are also aligned to each other. In addition, we sometimes find that records are cluttered with DOM tags, such as EM, which can be filtered out to reduce unimportant differences between records. Containers are the most difficult to identify. Although, our algorithm can often find containers using a higher distance threshold, e.g., 60% of the subtree sizes. Another approach for finding containers is to use the headers, which are more similar, and identify the container from the header. One embodiment combines information from headers and complete subtrees.

DOM Structure Search

The All-Subtree Edit Distance algorithm is further applicable to the problem of searching the web for a predefined DOM structure. In this use case, the user, or an application, seeks a known DOM structure, i.e., a pattern, in a collection of web pages. However, the pattern may be inexact. Applications that benefit from efficient search for inexact patterns include mashups, article extraction, and web automation.

To find all the similar occurrences of a pattern on a web page, we simply run the All-Subtree Edit distance algorithm with the DOM tree, $T_{pg}$, and the DOM tree representing the pattern, $T_{pat}$, as input. The distance of all the subtrees with the input pattern are computed in as the edit distance from the node to the root of the pattern, i.e., $D(T_{pg}(v_i), T_{pat}(root))$. Given, furthermore a similarity threshold, it is straightforward to return the desired search results. The time for this algorithm is $O(n \cdot k)$, where n is the size of the page and k is the size of the pattern. Assuming that the size of the pattern is small and independent of n, the algorithm is linear in the size of the input tree.

Notice the synergy between the DOM structure mining application and the DOM structure search application. Structure mining may be used to find repeating structures. For each repeating structure, the Frequent Similar Trees algorithm outputs a representative pattern, and similarity measure. This information may, in turn, be used to search for similar structures on other pages.

Embodiments of the present technology enable a threshold to distinguish between cluster and on-cluster members, whereas no such threshold can be set for method currently used. Further, embodiments provide for better recall in more complex cases, such as forums, and no over segmentation of the different sets.

Thus, embodiments provide a highly efficient method to mine a tree (or a forest) and find sets of sub-trees that are similar to each other. Embodiments are able to mine web pages, and, thus, use a tree edit distance that is appropriate for this application. This distance metric may be computed very efficiently using the all-tree edit distance algorithm, discussed herein. Based on this algorithm, a Frequent Similar Trees algorithm is also discussed, which is very accurate in recognizing repeated (yet far from identical) constructs in a variety of Web pages.

Example Computer System Environment

Figure 3:
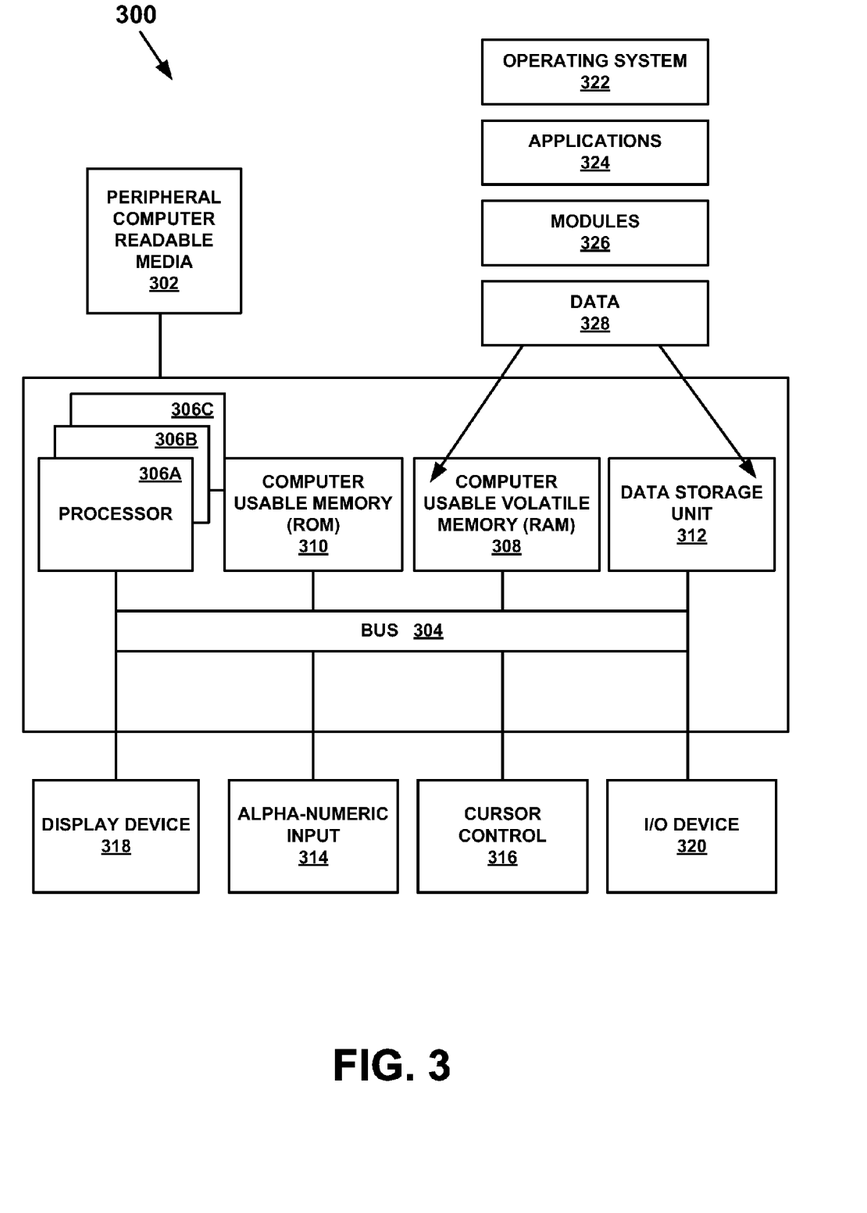
FIG. 3 is a diagram of an example computer system used for determining a similarity between tree related structures, according to one embodiment of the present technology.

With reference now to FIG. 3, portions of the technology for determining a similarity between tree related structures 102 are composed of computer-readable and computer-executable instructions that reside, for example, in computer-usable media of a computer system. That is, FIG. 3 illustrates one example of a type of computer that can be used to implement embodiments, which are discussed below, of the present technology.

FIG. 3 illustrates an example computer system 300 used in accordance with embodiments of the present technology. It is appreciated that system 300 of FIG. 3 is an example only and that the present technology can operate on or within a number of different computer systems including general purpose networked computer systems, embedded computer systems, routers, switches, server devices, user devices, various intermediate devices/artifacts, stand alone computer systems, and the like. As shown in FIG. 3, computer system 300 of FIG. 3 is well adapted to having peripheral computer readable media 302 such as, for example, a floppy disk, a compact disc, and the like coupled thereto.

System 300 of FIG. 3 includes an address/data bus 304 for communicating information, and a processor 306A coupled to bus 304 for processing information and instructions. As depicted in FIG. 3, system 300 is also well suited to a multi-processor environment in which a plurality of processors 306A, 306B, and 306C are present. Conversely, system 300 is also well suited to having a single processor such as, for example, processor 306A. Processors 306A, 306B, and 306C may be any of various types of microprocessors. System 300 also includes data storage features such as a computer usable volatile memory 308, e.g. random access memory (RAM), coupled to bus 304 for storing information and instructions for processors 306A, 306B, and 306C.

System 300 also includes computer usable non-volatile memory 310, e.g. read only memory (ROM), coupled to bus 304 for storing static information and instructions for processors 306A, 306B, and 306C. Also present in system 300 is a data storage unit 312 (e.g., a magnetic or optical disk and disk drive) coupled to bus 304 for storing information and instructions. System 300 also includes an optional alphanumeric input device 314 including alphanumeric and function keys coupled to bus 304 for communicating information and command selections to processor 306A or processors 306A, 306B, and 306C. System 300 also includes an optional cursor control device 316 coupled to bus 304 for communicating user input information and command selections to processor 306A or processors 306A, 306B, and 306C. System 300 of the present embodiment also includes an optional display device 318 coupled to bus 304 for displaying information.

Referring still to FIG. 3, optional display device 318 of FIG. 3 may be a liquid crystal device, cathode ray tube, plasma display device or other display device suitable for creating graphic images and alphanumeric characters recognizable to a user. Optional cursor control device 316 allows the computer user to dynamically signal the movement of a visible symbol (cursor) on a display screen of display device 318. Many implementations of cursor control device 316 are known in the art including a trackball, mouse, touch pad, joystick or special keys on alpha-numeric input device 314 capable of signaling movement of a given direction or manner of displacement. Alternatively, it will be appreciated that a cursor can be directed and/or activated via input from alpha-numeric input device 314 using special keys and key sequence commands.

System 300 is also well suited to having a cursor directed by other means such as, for example, voice commands. System 300 also includes an I/O device 320 for coupling system 300 with external entities. For example, in one embodiment, I/O device 320 is a modem for enabling wired or wireless communications between system 300 and an external network such as, but not limited to, the Internet. A more detailed discussion of the present technology is found below.

Referring still to FIG. 3, various other components are depicted for system 300. Specifically, when present, an operating system 322, applications 324, modules 326, and data 328 are shown as typically residing in one or some combination of computer usable volatile memory 308, e.g. random access memory (RAM), and data storage unit 312. However, it is appreciated that in some embodiments, operating system 322 may be stored in other locations such as on a network or on a flash drive; and that further, operating system 322 may be accessed from a remote location via, for example, a coupling to the internet. In one embodiment, the present technology, for example, is stored as an application 324 or module 326 in memory locations within RAM 308 and memory areas within data storage unit 312. The present technology may be applied to one or more elements of described system 300. For example, a method for identifying a device associated with a transfer of content may be applied to operating system 322, applications 324, modules 326, and/or data 328.

The computing system 300 is only one example of a suitable computing environment and is not intended to suggest any limitation as to the scope of use or functionality of the present technology. Neither should the computing environment 300 be interpreted as having any dependency or requirement relating to any one or combination of components illustrated in the example computing system 300.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What we claim is:

1. A method for determining a similarity between tree related structures, said method comprising:
    given a collection of trees, determining, at a computer system, according to an order a plurality of restricted top down model (RTDM) distances between a plurality of nodes residing on at least one tree related structure of said collection of trees, wherein said determining computes a distance between subtrees rooted at nodes for each pair of nodes and wherein said determining comprises traversing said at least one tree related structure exactly once and:
        determining, at said computer system, a first RTDM distance measurement between nodes of a first node pair of said plurality of nodes, wherein said determining said first RTDM distance comprises comparing prior determined RTDM distance measurements with said first node pair, wherein said prior determined RTDM distance measurements relate to node pairs preceding said first node pair within said order;
        comparing, at said computer system, said first RTDM distance measurement, said prior determined RTDM distance measurements and a second node pair of said plurality of nodes; and
        based on said comparing, generating, at said computer system, a second RTDM distance measurement.

2. The method of claim 1, wherein said determining according to an order at least one restricted top down model (RTDM) distance between a plurality of nodes residing on at least one tree related structure comprises:
    determining according to a reversed pre-order said at least one restricted top down model (RTDM) distance between said plurality of nodes residing on said at least one tree related structure.

3. The method of claim 1, further comprising:
    storing, at said computer system, said first and second RTDM distance measurements in a distance matrix store; and
    based on said first and second RTDM distance measurements stored in said distance matrix store, generating, at said computer system, a similarity measurement between nodes of at least one node pair of said plurality of node pairs to achieve a generated similarity measurement.

4. The method of claim 3, further comprising:
    clustering a first portion of said tree related structure based on said first and second RTDM distance measurements and said generated similarity measurement.

5. The method of claim 4, wherein said generating a similarity measurement comprises:
    determining a repetition within said tree related structure of a second portion of said tree related structure based on a size of said clustering.

6. The method of claim 5, wherein said determining a repetition within said tree related structure of a second portion of said tree related structure based on a size of said clustering comprises:
    determining a repetition of a structural arrangement on an area of a page; and
    based on a predetermined amount of said repetition, determining a semantic importance of said structural arrangement.

7. The method of claim 4, wherein said clustering a first portion of said tree related structure based on said first and second RTDM distance measurements comprises:
    clustering said first portion of said tree related structure having a predetermined similarity measurement that represents a closeness between sub-portions of said first portion.

8. The method of claim 1, wherein said determining a first RTDM distance between nodes of a first node pair of said plurality of nodes comprises:
    determining a first RTDM distance between a first node from a first tree of a forest and a first node from a second tree of said forest.

9. The method of claim 8, wherein said comparing said first RTDM distance measurement, said prior determined RTDM distance measurements and a second node pair of said plurality of nodes comprises:
    comparing, at said computer system, said first RTDM distance measurement, said prior determined RTDM distance measurements and a second node from said first tree and a second node from said second tree.

10. The method of claim 1, wherein said determining a first RTDM distance between nodes of a first node pair of said plurality of nodes comprises:
    determining, at said computer system, a first RTDM distance between a first node from a first subtree of a tree and a first node from a second subtree of said tree.

11. The method of claim 10, wherein said comparing said first RTDM distance measurement and said nodes of a second node pair of said plurality of nodes comprises:
    comparing said first RTDM distance measurement, said prior determined RTDM distance measurements and a second node from said first subtree and a second node from said second subtree.

12. A non-transitory computer-readable storage medium comprising instructions stored thereon which, when executed by a computer system, cause said computer system to perform a method for determining a similarity between tree related structures, said method comprising:

given a collection of trees, determining according to an order a plurality of restricted top down model (RTDM) distance measurements between a plurality of nodes residing on at least one tree related structure of said collection of trees, wherein said determining computes a distance between subtrees rooted at nodes for each pair of nodes and wherein said determining comprises traversing said at least one tree related structure exactly once and:

determining a first RTDM distance measurement between nodes of a first node pair of said plurality of nodes, wherein said determining said first RTDM distance measurement comprises comparing prior determined RTDM distance measurements with said first node pair, wherein said prior determined RTDM distance measurements relate to node pairs preceding said first node pair within said order; wherein said first node pair comprises a first node from a first tree of a forest and a first node from a second tree of said forest;

comparing said first RTDM distance measurement, said prior determined RTDM distance measurements and a second node pair of said plurality of nodes; and based on said comparing, generating a second RTDM distance measurement.

13. The non-transitory computer-readable storage medium of claim 12, wherein said method further comprises:

determining according to a reversed order at least one RTDM distance between a plurality of nodes residing on at least one tree related structure.

14. The non-transitory computer-readable storage medium of claim 12, wherein said method further comprises instructions for:

storing said first and second RTDM distance measurements in a distance matrix store; and based on said first and second RTDM distance measurements stored in said distance matrix store, generating a similarity measurement between nodes of at least one node pair of said plurality of node pairs to achieve a generated similarity measurement.

15. The non-transitory computer-readable storage medium of claim 14, wherein said method further comprises instructions for:

based on said first and second RTDM distance measurements and said generated similarity measurement, clustering a first portion of said forest.

16. The non-transitory computer-readable storage medium of claim 15, wherein said method further comprises instructions for:

determining a repetition within said forest of a second portion of said forest based on a size of said clustering.

17. The non-transitory computer-readable storage medium of claim 16, wherein said method further comprises instructions for:

determining a repetition of a structural arrangement on an area of a page; and based on a predetermined amount of said repetition, determining a semantic importance of said structural arrangement.

18. The non-transitory computer-readable storage medium of claim 15, wherein said method further comprises instructions for:

clustering said first portion of said forest close to each other based on similar first and second RTDM distance measurements.

19. A system comprising:

a first restricted top down model (RTDM) distance measurement determiner configured for determining according to an order a first RTDM distance measurement between nodes of a first node pair of a plurality of nodes of a tree related structure of a given collection of trees, wherein said determining computes a distance between subtrees rooted at nodes for each pair of nodes and wherein said determiner comprises traversing said tree related structure exactly once, wherein said first RTDM distance measurement is based on a comparison of prior determined RTDM distance measurements with said first node pair, wherein said prior determined RTDM distance measurements relate to node pairs preceding said first node pair within said order;

a comparer configured for comparing said first RTDM distance measurement, said prior determined RTDM distance measurements and said a second node pair of said plurality of nodes;

an RTDM distance measurement generator configured for generating a second RTDM distance measurement based on said comparing;

a distance matrix store configured for storing said first RTDM distance measurement, said prior determined RTDM distance measurements and said second RTDM distance measurement;

a similarity measurement generator configured for generating a similarity measurement between nodes of at least one node pair of said plurality of node pairs using said first and second RTDM distance measurements stored in said distance matrix store; and a cluster generator configured for clustering a first portion of said tree related structure based on said first and second RTDM distance measurements and said similarity measurement.

20. The system of claim 19, wherein said order is reversed.

* * * * *